R. M. TREAT & W. H. FIELD.
Assignees, by mesne assignments, of said R. M. TREAT, and the heirs of G. H. DALEY, dec'd.
Horse Hay-Rakes.
No. 7,974. Reissued Nov. 27, 1877.
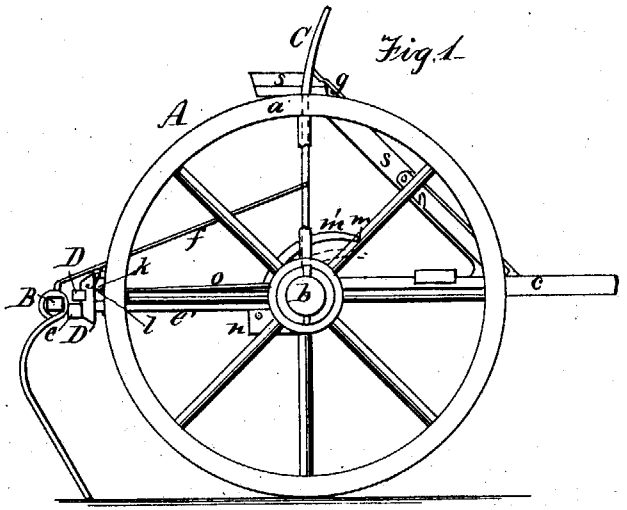
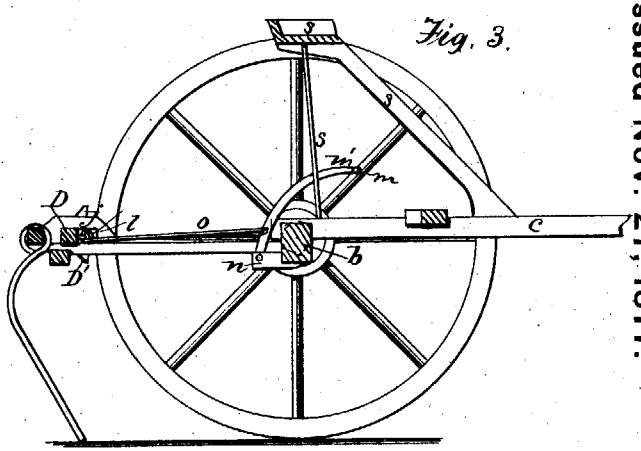
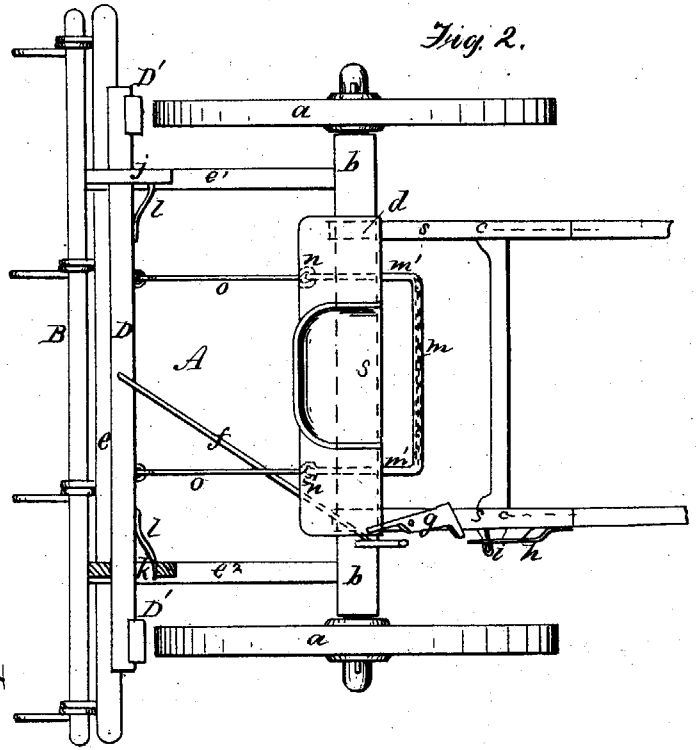
Witnesses;
Grenville Lewis
M. C. Linck
Inventors.
Robert M. Treat dec'd.
William H. Field, assignee
By Hill, Smith & Spear
Their Attys.
N. PETERS, PHOTO-LITHOGRAPHER, WASHINGTON, D. C.

UNITED STATES PATENT OFFICE.

ROBERT M. TREAT, OF MORRIS, CONNECTICUT, AND WILLIAM H. FIELD, OF PORT CHESTER, N. Y., ASSIGNEES, BY MESNE ASSIGNMENTS, OF SAID ROBERT M. TREAT AND THE HEIRS OF GEORGE H. DALEY, DECEASED.

IMPROVEMENT IN HORSE HAY-RAKES.

Specification forming part of Letters Patent No. 36,897, dated November 11, 1862; Reissue No. 7,974, dated November 27, 1877; application filed December 13, 1876.

*To all whom it may concern:*

Be it known that GEORGE H. DALEY and ROBERT M. TREAT, of Morris, in the county of Litchfield and State of Connecticut, did invent certain new and useful Improvements in Horse Hay-Rakes; and we do hereby declare the following to be a full, clear, and exact description of the same, reference being had to the accompanying drawing, forming part of this specification, in which—

Figure 1 is a side view of the invention; Fig. 2, a top-plan view of the same; and Fig. 3, a longitudinal vertical section.

Similar letters of reference in the accompanying drawings denote the same parts.

This invention relates to wheeled hay-rakes in which the teeth are lifted to dump the load by locking them to a revolving part of the machine; and it consists, essentially, of a frictional contact to form such locking-connection between the teeth and the revolving part, the pressure by which the friction is caused being applied transverse to the axle.

The invention further consists in the adaptation of this frictional apparatus, acting transversely to the revolving part, to tilt an oscillating axle; and, still further, in the combination, with such frictional apparatus applied transversely to the axle at the will of the operator, of a spring or equivalent mechanism, for the automatic release of such apparatus.

Prior to this invention, in rakes of the class specified it has been customary to connect the teeth more or less directly to the revolving part or parts, through the agency of which the lifting was effected, by positive and unyielding connections. These positive connections are more or less elaborate in construction, and require nice adjustment, especially in the releasing apparatus. When the connection is made the full speed and momentum of the machine is thrown upon the rake itself and subjecting the parts to sudden shocks, and making it necessary to have the mechanism stronger and heavier.

Further, in all positive connections the teeth are raised to a certain point and then dropped the whole distance to the ground, the tendency of which is, especially in soft or uneven ground, to drive the teeth into the earth. It is also necessary, in some instances, to hold the teeth elevated, or to arrest their fall, as in passing over a windrow of more than ordinary width or crossing ravines and the like. With the frictional device the teeth can be held up or arrested at any point, or lowered as gently as may be required or desired. The only expedient which appears to have been offered as a remedy for this evil is a train of gears connected directly to the oscillating head of the rake, and moved by frictional contact with one of the wheels, excepting, perhaps, the somewhat doubtful suggestion of friction applied against the plain end of the hub longitudinally of the axis. The former is not a locking-connection, and the rake is not carried with the wheels or axle, the movement of the parts not being the same, as is the case with direct connections. The latter case is simply impracticable.

This invention is intended and is found to be a practical and efficient remedy for the evils specified.

The following is a description, with reference to the drawings, of one way of carrying the invention into practical effect, the description being sufficiently full and exact to enable any one skilled in the art to which the said invention belongs to make and use the same.

A, in the several figures of the drawings, represents a wheeled horse hay-rake, patented to Robert M. Treat, June 10, 1862. The wheels *a a* revolve, and the axle B turns in the path of a circle vertically. The thills *c c* are jointed loosely at *d d* to the axle, and the driver's seat *s* is suspended upon the same. The rake-head B is attached rigidly to the axle by means of a frame, *e*, or bars *e′ e′*, which extend out at right angles from the rear side of the axle, and it (the rake-head) is set in rear of the wheels and extends laterally beyond the outer faces of the same. The lever C, by which the rake-head is raised, is fastened rigidly in the top of the axle, and is connected to the rake-head by a diagonal rod, *f*. This lever is retained in any desired position after the rake-head is elevated by means of a pivoted catch, *g*, or a perforated bracket, *h*, and stop-pin *i*.

To the rake thus described the brake is applied as follows: The bar D, with blocks D′ D′, is placed on the top of the frame *e e′ e′*, so that the blocks stand behind the circumference or periphery of the wheels *a a*. In this position it is confined so as to have back and forward (but not upward) play, by means of half-boxes *j j*, screwed upon the rear ends of the bars *e′ e′*, as represented. These half-boxes form oblong slots *k k* between themselves and the bars, and in said slots the brake-bar D slides, so as to come with the blocks in frictional contact with the periphery of the wheels *a a*. Flat springs *l l* are attached to the front side of the brake-bar D, and with their free ends bear against the front shoulders of the boxes *j j*, and thus keep the brake-blocks out of contact with the periphery of the wheels *a a* when the rake-head is not elevated and while the teeth thereof are raking up hay from the ground. The brake-block thus arranged is connected to the axle *b* by means of a curved foot-lever frame, *m m′ m′*, hinging brackets *n n*, and link-connecting rods *o o*, as represented. The brackets *n n* screw to the under side of the axle at a suitable distance apart, and extend beyond the rear of the same. The lever-frame is formed of two segment-arms or side bars, *m′*, and a transverse bar, *m*, and hinges, by the lower ends of its segment-arms, to the brackets; and the connecting-rods link to the brake-bar D, and also to the segment-arms, just above the hinge of the brackets.

The brake-bar thus applied is readily operated, as the lever-frame extends, by reason of its curve form, under and below the driver's seat.

The operation is as follows: The driver sitting upon the seat, with his hand upon or off the hand-lever, the rake is drawn over the field until the teeth have collected the proper quantity of hay. At this stage, it being necessary to relieve the rake of the collected hay, the driver adjusts his foot upon the part *m* of the lever-frame and allows his weight to act upon it. This causes the brake-bar and blocks to move up to the wheels far enough to produce frictional contact between the blocks and the wheels. Now, as the machine continues to move the wheels carry the brake and rake-head up around with them until the teeth are relieved, and the driver withdraws his foot from the lever-frame. The gravity of the rake-head insures its return or descent, while the springs throw the brake-block out of frictional contact with the wheels.

The brake-blocks may be of leather, rubber, or any other suitable material—that is, they may be faced with such material.

We claim—

1. In a wheeled horse hay-rake, the combination of a revolving traction-wheel, a partially-revolving rake-head, and a friction-clutch, connected with the rake, and forming the means of locking the rake-head and traction-wheels directly together by friction without the use of intermediate pulleys, cranks, or other gearing, substantially as described.

2. The combination and arrangement of the lever-frame *m m′ m′*, brackets *n n*, link-connecting rods *o o*, and brake D D′ D′ with a horse hay-rake, mounted upon wheels, and having a driver's seat, substantially in the manner and for the purposes described.

ROBERT M. TREAT.
WILLIAM H. FIELD.

Witnesses to signature of Robert M. Treat:
GEO. C. WOODRUFF,
GEO. M. WOODRUFF.

Witnesses to signature of Wm. H. Field:
JOHN E. MARSHALL,
WILLIAM BAWL.